United States Patent
Benson et al.

(10) Patent No.: US 10,894,593 B2
(45) Date of Patent: Jan. 19, 2021

(54) UAV WITH FRANGIBLE AIRFRAME STRUCTURES

(71) Applicant: Wing Aviation LLC, Mountain View, CA (US)

(72) Inventors: Stephen Benson, San Carlos, CA (US); Christian Nielsen, Mountain View, CA (US); Adam Woodworth, San Jose, CA (US)

(73) Assignee: Wing Aviation LLC, Mountain View, CA (US)

( * ) Notice: Subject to any disclaimer, the term of this patent is extended or adjusted under 35 U.S.C. 154(b) by 417 days.

(21) Appl. No.: 15/964,733

(22) Filed: Apr. 27, 2018

(65) Prior Publication Data

US 2019/0329857 A1 Oct. 31, 2019

(51) Int. Cl.
*B64C 1/26* (2006.01)
*B64C 1/06* (2006.01)
(Continued)

(52) U.S. Cl.
CPC ............ *B64C 1/26* (2013.01); *B64C 1/061* (2013.01); *B64C 29/0025* (2013.01);
(Continued)

(58) Field of Classification Search
CPC ......... B64C 1/26; B64C 1/061; B64C 39/024; B64C 29/0025; B64C 2201/165; B64C 2201/104; B64C 2201/108
See application file for complete search history.

(56) References Cited

U.S. PATENT DOCUMENTS 4,032,245 A 6/1977 Woodruff
6,425,794 B1 7/2002 Levy et al.
(Continued)

FOREIGN PATENT DOCUMENTS

JP 2003056524 A 2/2003
JP 2003294016 A 10/2003
JP 2006055647 A 3/2006

OTHER PUBLICATIONS

"Amazon patents self-destructing drone that falls apart in am emergency", The Verge, retrieved from internet <https://www.theverge.com/2017/12/1/16723190/amazon-self-destructing-drone-falls-apart-midair-patent> Mar. 26, 2018, 2 pages.
(Continued)

*Primary Examiner* — Brian M O'Hara
*Assistant Examiner* — Keith L Dixon
(74) *Attorney, Agent, or Firm* — Christensen O'Connor Johnson Kindness PLLC

(57) ABSTRACT

A mechanical joiner for an airframe includes a joiner core and first and second caps. The joiner core has a first side with a first cradle shaped to hold a first structural member and a second side with a second cradle shaped to hold a second structural member. The first cap is shaped to mate to the first side and clamp the first structural member into the first cradle. The joiner core includes a first hole for a first mechanical fastener to extend through and across the first cradle and secure the first cap to the joiner core. The second cap is shaped to mate to the second side and clamp the first structural member into the second cradle. The second cap includes second holes for second mechanical fasteners, distinct from the first mechanical fastener, to secure the second cap to the joiner core.

21 Claims, 7 Drawing Sheets

(51) Int. Cl.
*B64C 39/02* (2006.01)
*B64C 29/00* (2006.01)

(52) U.S. Cl.
CPC ...... *B64C 39/024* (2013.01); *B64C 2201/104* (2013.01); *B64C 2201/108* (2013.01); *B64C 2201/165* (2013.01)

(56) References Cited

U.S. PATENT DOCUMENTS

| | | |
|---|---|---|
| 7,237,750 B2 | 7/2007 | Chiu et al. |
| 8,136,766 B2 | 3/2012 | Dennis |
| 9,828,097 B1 | 11/2017 | Mishra et al. |
| 2017/0106978 A1 | 4/2017 | Sopper et al. |
| 2017/0297738 A1* | 10/2017 | von Flotow .............. B64F 1/02 |
| 2018/0148153 A1* | 5/2018 | Conti ........................ B64C 1/12 |

OTHER PUBLICATIONS

Jansen, Bart, "CNN receives first-of-its-kind waiver to fly drone over crowds", USA Today, Oct. 18, 2017, 2 pages.
International Search Report and Written Opinion, dated Aug. 29, 2019 in corresponding international application No. PCT/US2019/029008, 11 pages.

\* cited by examiner

UAV WITH FRANGIBLE AIRFRAME STRUCTURES

TECHNICAL FIELD

This disclosure relates generally to unmanned aerial vehicles, and in particular but not exclusively, relates to airframes of unmanned aerial vehicles.

BACKGROUND INFORMATION

An unmanned vehicle, which may also be referred to as an autonomous vehicle, is a vehicle capable of travel without a physically-present human operator. An unmanned vehicle may operate in a remote-control mode, in an autonomous mode, or in a partially autonomous mode.

When an unmanned vehicle operates in a remote-control mode, a pilot or driver that is at a remote location can control the unmanned vehicle via commands that are sent to the unmanned vehicle via a wireless link. When the unmanned vehicle operates in autonomous mode, the unmanned vehicle typically moves based on pre-programmed navigation waypoints, dynamic automation systems, or a combination of these. Further, some unmanned vehicles can operate in both a remote-control mode and an autonomous mode, and in some instances may do so simultaneously. For instance, a remote pilot or driver may wish to leave navigation to an autonomous system while manually performing another task, such as operating a mechanical system for picking up objects, as an example.

Various types of unmanned vehicles exist for various different environments. For instance, unmanned vehicles exist for operation in the air, on the ground, underwater, and in space. Unmanned aerial vehicles (UAVs) are becoming more popular in general. Their use over populated areas, such as suburban and urban localities, means that designed in safety measures and components are increasingly important.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. Not all instances of an element are necessarily labeled so as not to clutter the drawings where appropriate. The drawings are not necessarily to scale, emphasis instead being placed upon illustrating the principles being described.

DETAILED DESCRIPTION

Figure 1A:
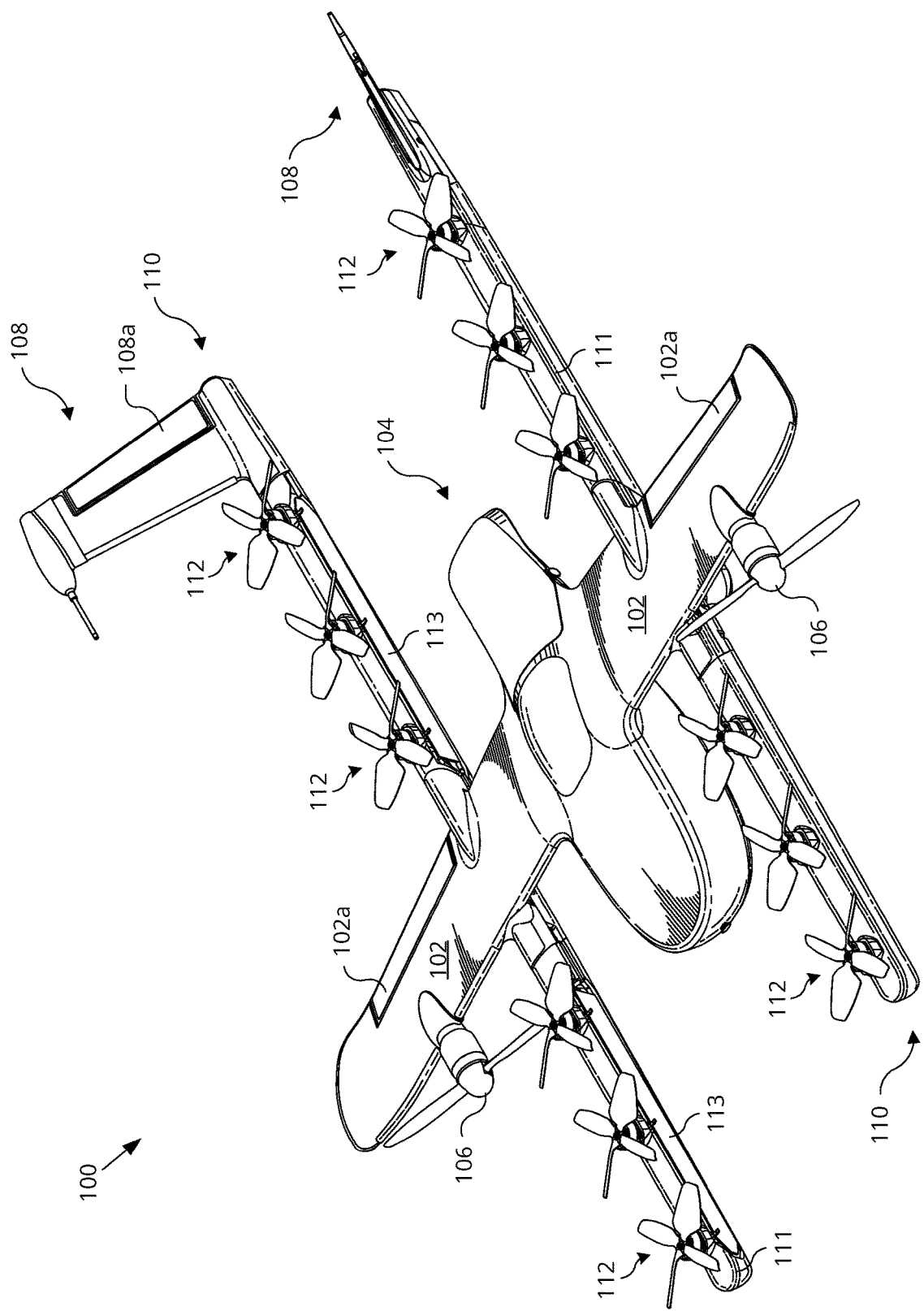
FIG. 1A is a perspective view illustration of an unmanned aerial vehicle (UAV) having frangible airframe structures to decouple kinetic energy between linked structures in the event of a collision, in accordance with an embodiment of the disclosure.

Embodiments of a system, apparatus, and method of operation for a structural joiner having a frangible design that preferentially decouples kinetic energy between linked structures in the event of a collision of a threshold magnitude are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Embodiments described herein describe mechanical joiners and techniques for securing airframe structures to each other in a "frangible" manner that permits these structures to fail in the event of a collision, thereby decoupling kinetic energy between linked structures in a controlled failure mode. The mechanical structures are designed to break in a specified manner in specified locations to control where the impact kinetic energy is directed. These mechanical joiners are well suited for use in aerial vehicles, such as unmanned aerial vehicles (UAVs). An UAV refers to any autonomous or semi-autonomous vehicle that is capable of performing some functions without a physically present human pilot. A UAV can take various forms, such as a fixed-wing aircraft.

UAVs have structural elements that operate as a skeleton or frame, to which other elements are mounted, for carrying load forces during operation. Examples of such structural elements include wing spars, booms, and the like. These elements should be strong while also lightweight. To achieve a balance between strength and weight, these structural elements are often hollow (e.g., tubular) members fabricated of materials such as metal (e.g., aluminum), fiberglass, carbon fiber (e.g., filament wound carbon fiber tubes), or otherwise.

Accordingly, embodiments described herein contemplate mechanical joiners that break upon impact and separate the high mass components of the fuselage from elongated mechanical structures. This separation prevents the kinetic energy and deceleration force of the fuselage from being directed down a boom or rod upon a catastrophic impact. This separation of the higher mass components from the elongated, high strength and slender airframe components improves safety and reduces property damage in the event of crash landings of a UAV. Instead of directing the energy of the collision to the tip of the boom, the collision energy of the fuselage is dissipated in the collision of the fuselage itself, which is a broad, blunt object. In various embodiments, the fuselage is modular and the individual sections are also joined with frangible mechanical joiners that are design to break on impact, further dissipating collision energy.

Figure 1B:
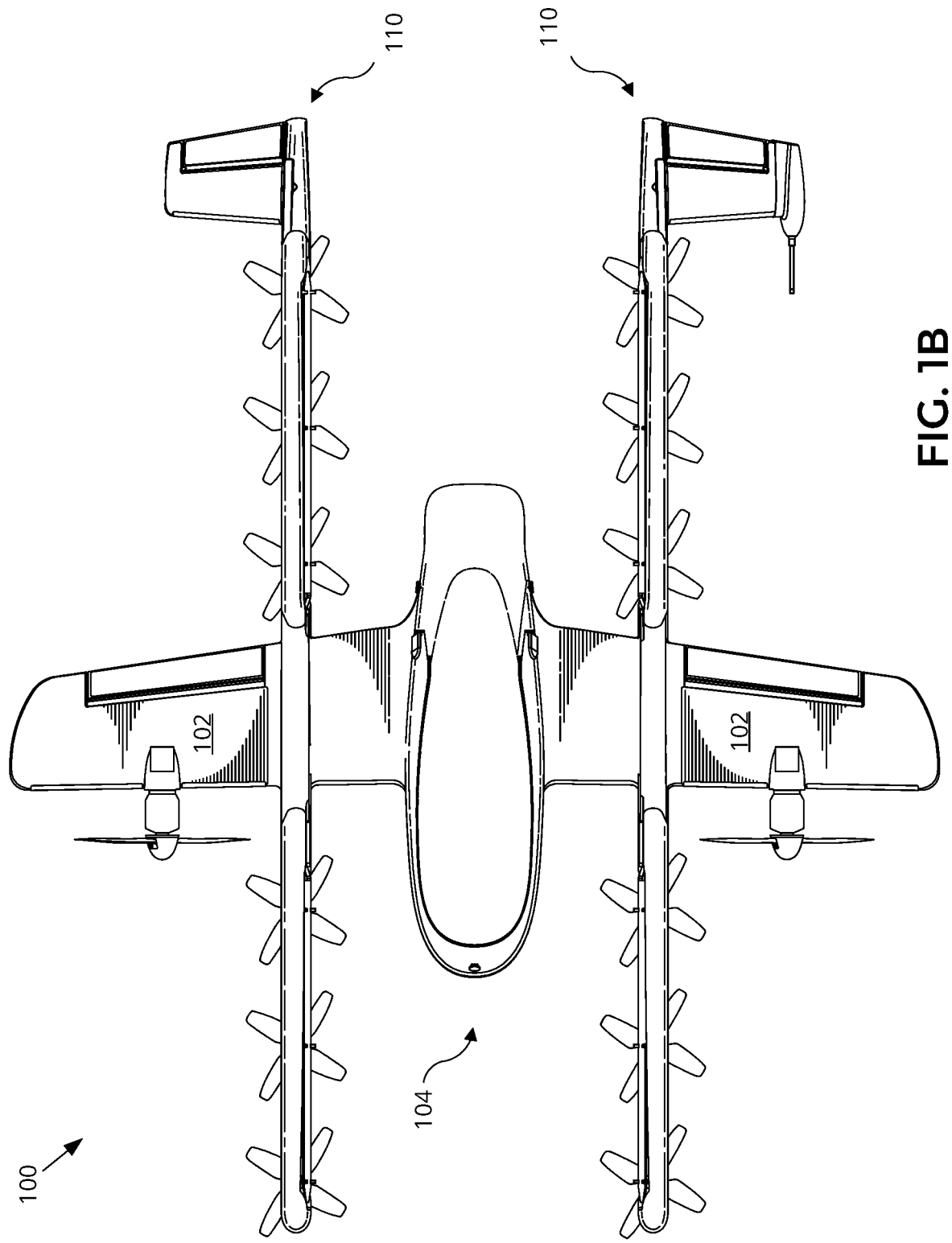
FIG. 1B is a plan view illustration of a bottom side of the UAV, in accordance with an embodiment of the disclosure.

FIGS. 1A and 1B illustrate an aerial vehicle 100, in accordance with an embodiment of the disclosure. The illustrated embodiment of aerial vehicle 100 is a vertical takeoff and landing (VTOL) unmanned aerial vehicle (UAV) that includes separate propulsion units 106 and 112 for providing horizontal and vertical propulsion, respectively. Aerial vehicle 100 is a fixed-wing aerial vehicle, which as the name implies, has a wing assembly 102 that can generate lift based on the wing shape and the vehicle's forward airspeed when propelled horizontally by propulsion units 106. FIG. 1A is a perspective top view illustration of aerial vehicle 100 while FIG. 1B is a bottom side plan view illustration of aerial vehicle 100.

The illustrated embodiment of UAV 100 includes a fuselage 104. In one embodiment, fuselage 104 is modular and includes a battery module, an avionics module, and a mission payload module. These modules are detachable from each other and mechanically securable to each other to contiguously form at least a portion of the fuselage or UAV main body.

The battery module includes a cavity for housing one or more batteries for powering aerial vehicle 100. The avionics module houses flight control circuitry of aerial vehicle 100, which may include a processor and memory, communication electronics and antennas (e.g., cellular transceiver, wifi transceiver, etc.), and various sensors (e.g., global positioning sensor, an inertial measurement unit (IMU), a magnetic compass, etc.). The mission payload module houses equipment associated with a mission of aerial vehicle 100. For example, the mission payload module may include a payload actuator for holding and releasing an externally attached payload. In another embodiment, the mission payload module may include a camera/sensor equipment holder for carrying camera/sensor equipment (e.g., camera, lenses, radar, lidar, pollution monitoring sensors, weather monitoring sensors, etc.).

The illustrated embodiment of UAV 100 further includes horizontal propulsion units 106 positioned on wing assembly 102, which can each include a motor, shaft, motor mount, and propeller, for propelling UAV 100. The illustrated embodiment of UAV 100 includes two boom assemblies 110 that secure to wing assembly 102. In one embodiment, wing assembly 102 includes a wing spar 203 (see FIG. 2) disposed within a wing foil of wing assembly 102. Wing spar 203 may be a hollow structural member (e.g., tubular rod) extending along the internal length of the wing foil and provides a main structural member that connects wing assembly 102 to fuselage 104 and to which boom assemblies 110 mount.

The illustrated embodiments of boom assemblies 110 each include a boom housing 111 in which a boom 214 (see FIG. 2) is disposed, vertical propulsion units 112, printed circuit boards 113, and stabilizers 108. In the illustrated embodiment, booms 214 are also hollow structural members (e.g., tubular rods) that provide the main structural support to which wing spar 103 and vertical propulsion units 112 are mounted. Booms 214 are also referred to as "boom carriers" since they carry the load forces on boom assemblies 110. Vertical propulsion units 112 can each include a motor, shaft, motor mounts, and propeller, for providing vertical propulsion. Vertical propulsion units 112 may be used during a hover mode where UAV 100 is descending (e.g., to a delivery location) or ascending (e.g., following a delivery). Stabilizers 108 (or fins) may be included with UAV 100 to stabilize the UAV's yaw (left or right turns) during flight. In some embodiments, UAV 100 may be configured to function as a glider. To do so, UAV 100 may power off its propulsion units and glide for a period of time.

During flight, UAV 100 may control the direction and/or speed of its movement by controlling its pitch, roll, yaw, and/or altitude. For example, the stabilizers 108 may include one or more rudders 108a for controlling the UAV's yaw, and wing assembly 102 may include elevators for controlling the UAV's pitch and/or ailerons 102a for controlling the UAV's roll. As another example, increasing or decreasing the speed of all the propellers simultaneously can result in UAV 100 increasing or decreasing its altitude, respectively.

Many variations on the illustrated fixed-wing aerial vehicle are possible. For instance, aerial vehicles with more wings (e.g., an "x-wing" configuration with four wings), are also possible. Although FIGS. 1A and 1B illustrate one wing assembly 102, two boom assemblies 110, two horizontal propulsion units 106, and six vertical propulsion units 112 per boom assembly 110, it should be appreciated that other variants of aerial vehicle 100 may be implemented with more or less of these components.

It should be understood that references herein to an "unmanned" aerial vehicle or UAV can apply equally to autonomous and semi-autonomous aerial vehicles. In a fully autonomous implementation, all functionality of the aerial vehicle is automated; e.g., pre-programmed or controlled via real-time computer functionality that responds to input from various sensors and/or pre-determined information. In a semi-autonomous implementation, some functions of an aerial vehicle may be controlled by a human operator, while other functions are carried out autonomously. Further, in some embodiments, a UAV may be configured to allow a remote operator to take over functions that can otherwise be controlled autonomously by the UAV. Yet further, a given type of function may be controlled remotely at one level of abstraction and performed autonomously at another level of abstraction. For example, a remote operator may control high level navigation decisions for a UAV, such as specifying that the UAV should travel from one location to another (e.g., from a warehouse in a suburban area to a delivery address in a nearby city), while the UAV's navigation system autonomously controls more fine-grained navigation decisions, such as the specific route to take between the two locations, specific flight controls to achieve the route and avoid obstacles while navigating the route, and so on.

Figure 2:
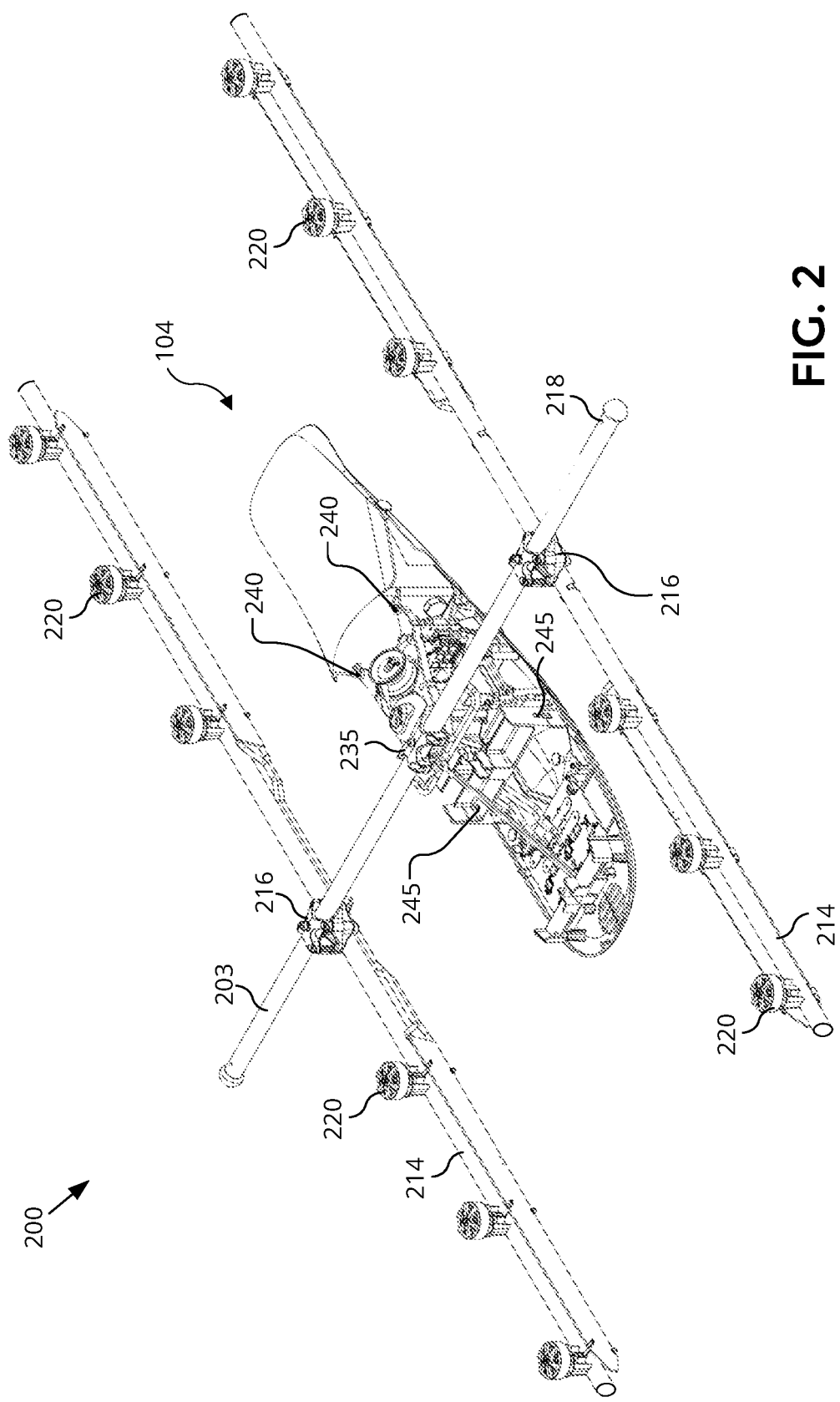
FIG. 2 is a perspective view illustration of an airframe of the UAV with integrated frangible airframe structures to decouple kinetic energy between linked structures in the event of a collision, in accordance with an embodiment of the disclosure.

FIG. 2 is a perspective view illustration of a structural airframe 200 (also referred to as a "structural H-frame" or an "H-frame") of UAV 100, in accordance with an embodiment of the disclosure. H-frame 200 includes wing spar 203 and booms 214. In some embodiments wing spar 203 and booms 214 may be made of carbon fiber, hard plastic, aluminum, light metal alloys, or otherwise. Wing spar 203 and booms 214 are mechanically connected with spar-boom joiners 216. Spar-boom joiners 216 are mechanical joiners that clamp wing spar 103 to booms 214 with a "frangible" design. Wing spar 203 may include pre-drilled holes 218 for mounting horizontal propulsion units 106, and boom carriers 214 may include pre-drilled holes (hidden by motor mounts 220) for mounting vertical propulsion units 112. In the illustrated embodiment, fuselage 104 is removeably attached to the H-frame with a spar joiner 235 that clamps onto wing spar 203.

As mentioned above, mechanical joiners 216 and/or 235 may be frangible structures designed to break apart to decouple the kinetic energy between linked structures in the event of a catastrophic impact or crash landing. This controlled failure mode improves safety and reduces property damage in the event of crash landings of UAV 100 by diverting impact energy way from booms 214 and/or wing spar 203. In one embodiment, the mechanical fasteners 240, which structurally join the rear avionics module to the middle mission payload module, are selected and/or designed to shear or otherwise fail upon impact of fuselage 104. In one embodiment, mechanical fasteners 245, which structurally join the middle mission payload module to the front battery module, are also selected and/or designed to shear or otherwise fail upon impact of fuselage 104. In one embodiment, mechanical fasteners 240 and 245 are plastic fasteners (e.g., nylon, polyetheretherketone, etc.).

Figure 3A:
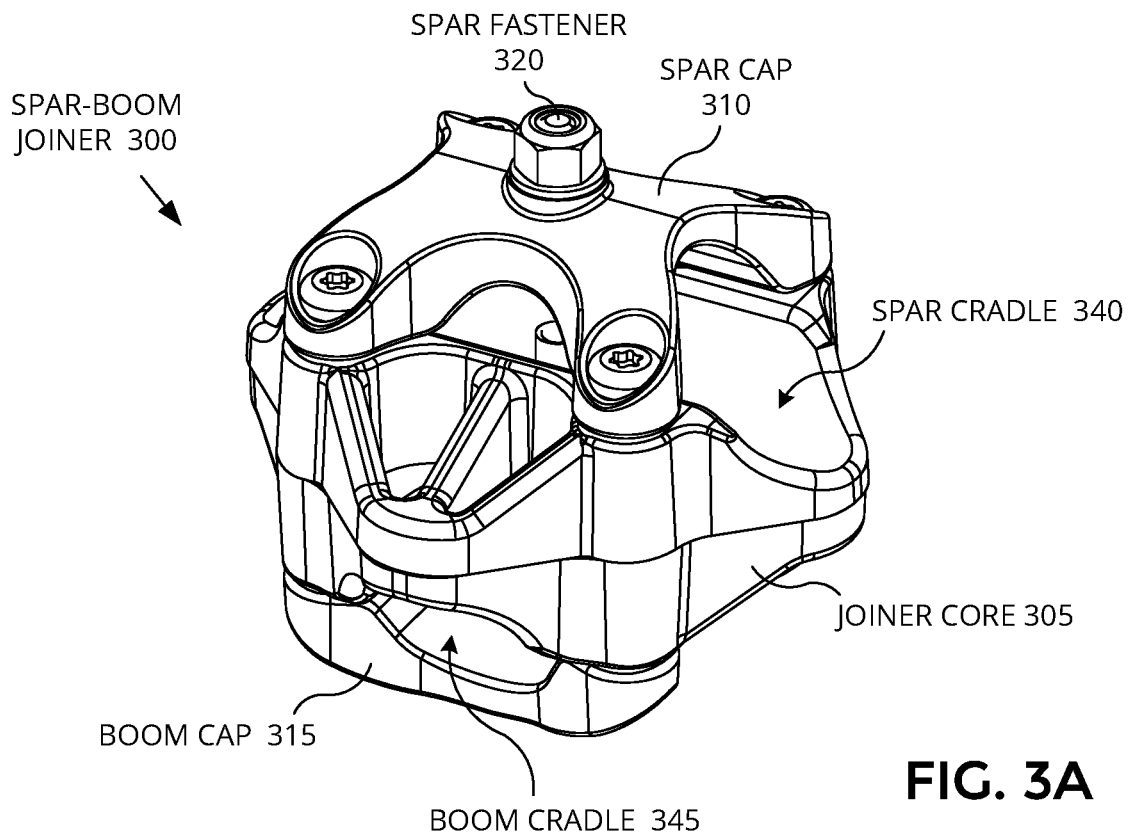
FIGS. 3A and 3B are a perspective view illustrations of a spar-boom joiner having a frangible design to decouple kinetic energy between linked structures in the event of a collision, in accordance with an embodiment of the disclosure.
Figure 3B:
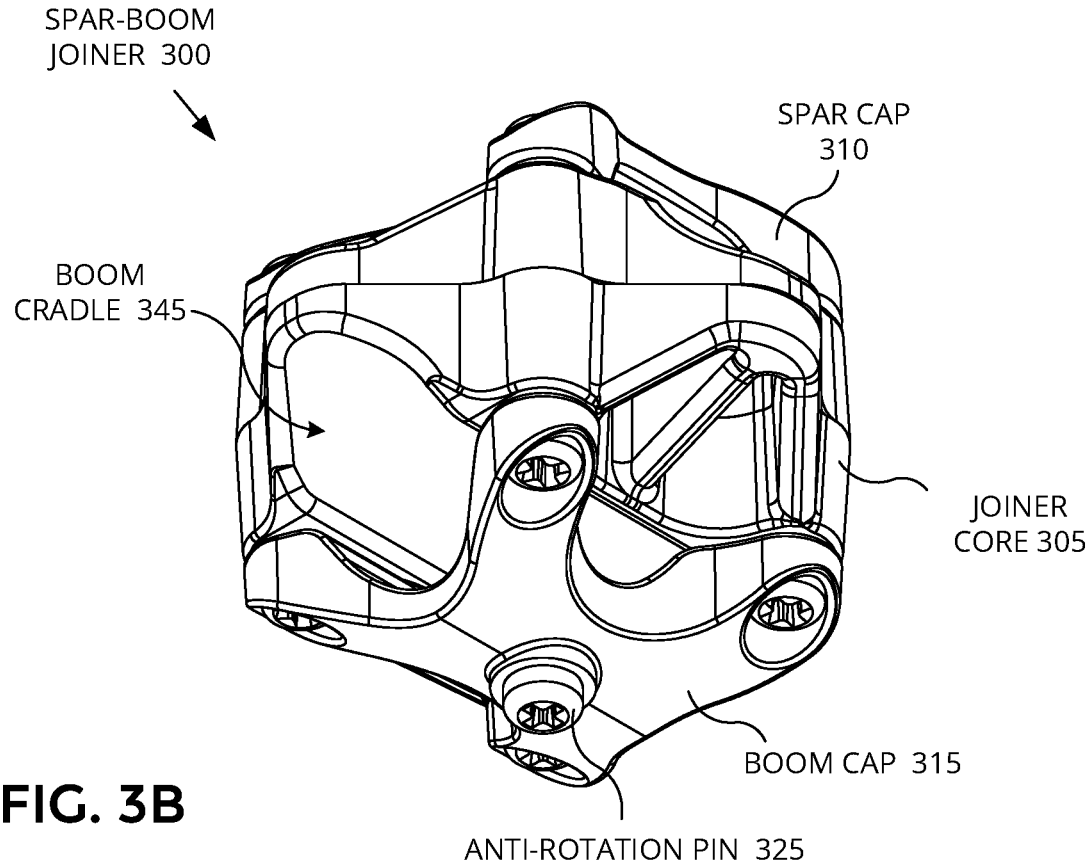
Figure 3C:
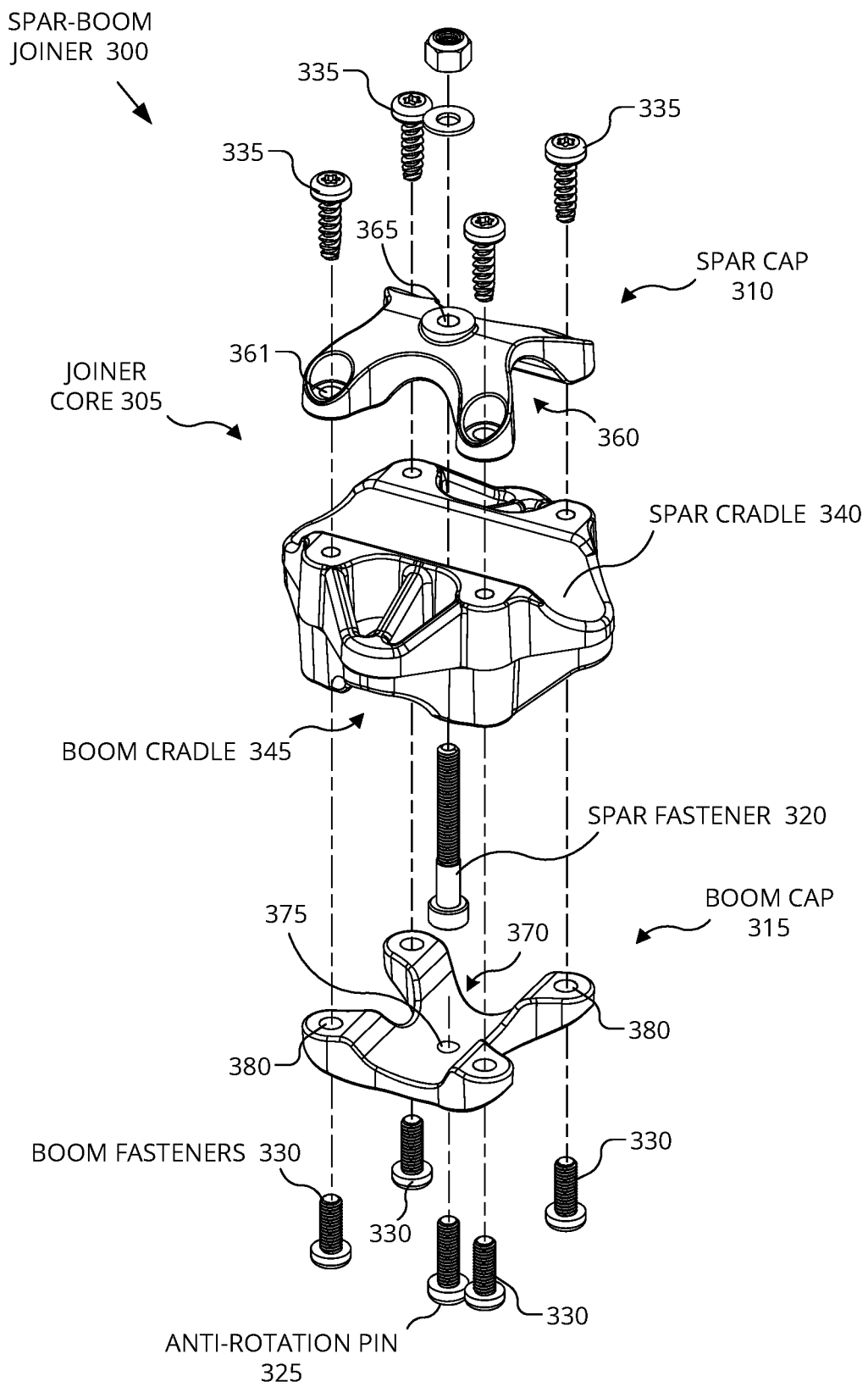
FIG. 3C is an exploded view illustration of the spar-boom joiner, in accordance with an embodiment of the disclosure.
Figure 3F:
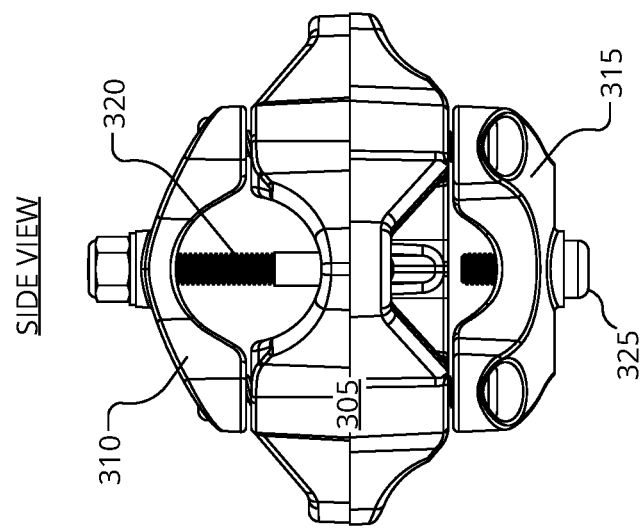
FIGS. 3D, E, and F are top, bottom, and side view illustrations, respectively, of the spar-boom joiner, in accordance with an embodiment of the disclosure.
FIG. 3G is a cross-sectional illustration of the spar-boom joiner, in accordance with an embodiment of the disclosure.
Figure 3E:
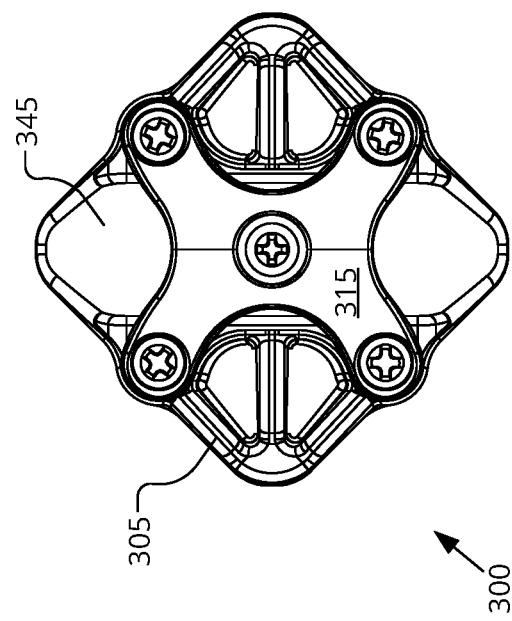
Figure 3D:
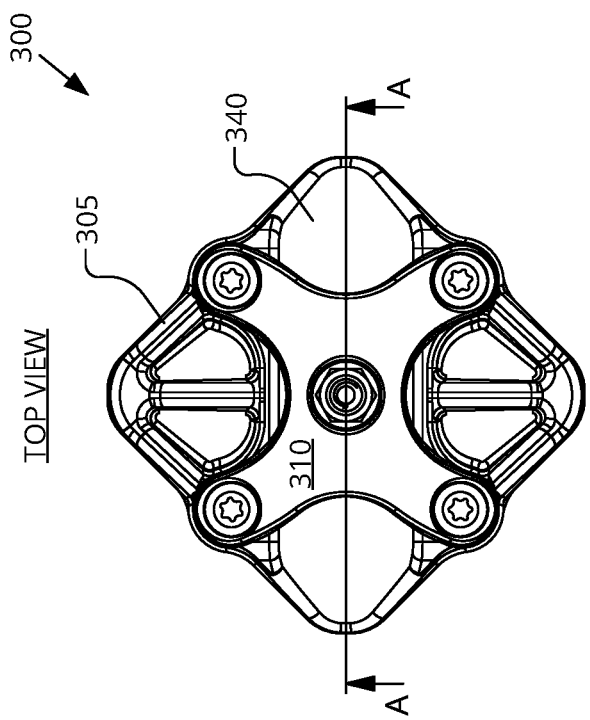
Figure 3G:
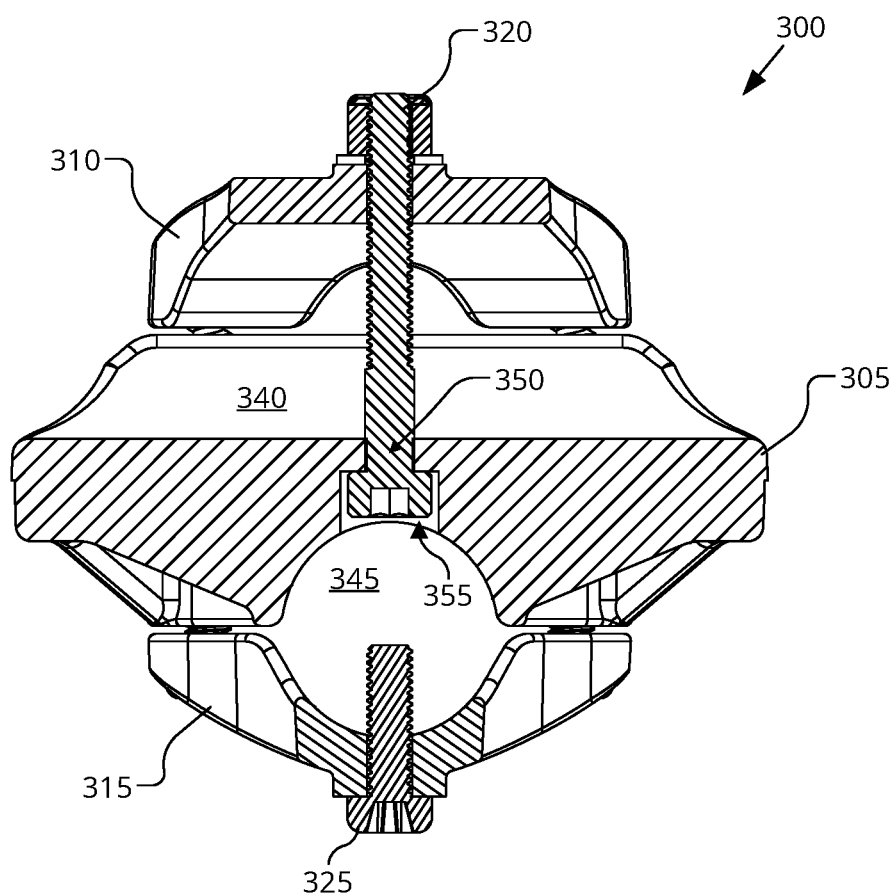

FIGS. 3A-G illustrate various views of a spar-boom joiner 300 having a frangible design to decouple kinetic energy between linked structures in the event of a collision, in accordance with an embodiment of the disclosure. Spar-boom joiner 300 is one possible implementation of mechanical joiners 216 illustrated in FIG. 2. FIGS. 3A and 3B are a perspective view illustrations, FIG. 3C is an exploded view illustration, FIGS. 3D, E, and F are top, bottom, and side view illustrations, respectively, and FIG. 3G is a cross-sectional illustration all of spar-boom joiner 300. Referring to FIG. 3C, the illustrated embodiment of spar-boom joiner 300 includes a joiner core 305, a spar cap 310, a boom cap 315, a spar fastener 320, an anti-rotation pin 325, boom fasteners 330, and spar-cap fasteners 335. The illustrated embodiment of joiner core 305 includes spar cradle 340, boom cradle 345, hole 350, and recess 355 (see FIG. 3G). The illustrated embodiment of spar cap 310 includes a spar cradle 360, hoes 361, and fastener hole 365. The illustrated embodiment of boom cap 315 includes a boom cradle 370, pin hole 375, and holes 380.

Spar-boom joiner 300 is a mechanical bracket or joiner that secures structural members of airframe 200 to each other. In particular, spar-boom joiner 300 secures one of booms 214 to wing spar 203 with sufficient strength and rigidity to withstand the linear, shear, and torsional forces that arise during ordinary operation of UAV 100. The illustrated embodiment of joiner core 305 includes boom cradle 345 on its lower side that conforms to and clamps around one of booms 214 to hold it securely in place. Similarly, joiner core 305 further includes spar cradle 340 on its upper side (opposite its lower side) that conforms to and clamps around wing spar 203 to hold it securely in place. Although FIGS. 3A-G illustrate joiner core 305, spar cap 310, and boom cap 315 as being three distinct and separable components, in other embodiments, these components may be molded as a single contiguous component with slits that permit insertion and clamping of wing spar or boom members into their respective cradles. In one embodiment, joiner core 305, spar cap 310, and boom cap 315 are fabricated of glass filled nylon. Other materials may be used.

In one embodiment, spar-fastener 320 is a metal fastener (e.g., bolt and nut) that extends through hole 350 (FIG. 3G) in joiner core 305, through a hole in wing spar 203 (not illustrated), across spar cradle 340, and through spar cap 310. Spar-fastener 320 does not extend through boom cap 315 or boom 214. The head of spar fastener 320 is recessed into boom cradle 345 (e.g., see recess 355 in FIG. 3G) so as not to physically interfere with seating boom 214 into boom cradle 345. Spar fastener 320 serves to mechanically secure spar cap 310 to joiner core 305 but also prevents movement or rotation of wing spar 203 within spar cradle 340. Spar cap 310 also includes a spar cradle 360 that wraps around the top of wing spar 203 and along with four spar-cap fasteners 335 (e.g., metal screws) clamps to the top side of joiner core 305.

The illustrated embodiment of boom cap 315 includes boom cradle 370 that mates to boom cradle 345 in joiner core 305, which collectively conform to the cross sectional shape of a given boom 214. Boom cap 315 is secured to joiner core 305 with four boom fasteners 330, which serve to clap boom 214 between boom cap 315 and joiner core 305. Additionally, boom cap 315 includes hole 375 through which anti-rotation pin 325 inserts into boom 214 to prevent rotational movement of boom 214 within boom cradle 345. In one embodiment, anti-rotation pin 325 is a plastic screw (e.g., nylon) that threads through tapped hole 375 into boom 214. In one embodiment, hole 375 is an untapped hole and anti-rotation pin 325 is secured in place with adhesive. In yet another embodiment, anti-rotation pin 325 is a pin or boss molded into boom cap 315. In yet other embodiments, anti-rotation pin 325 may run all the way through boom 214 and spar 203 replacing spar fastener 320. Due to the fabrication tolerances, in some embodiments, a layer of adhesive (e.g., cyanoacrylate, etc.) is also applied to the inside surface of boom cap 315 that conforms with and mates to boom 214 (i.e., boom cradle 370 on boom cap 315) to maintain a precise rotational position without slop. However, in these embodiments, the adhesive is not applied to boom cradle 345 on joiner core 305. Bonding boom 214 to boom cap 315 while not bonding to joiner core 305 controls the failure mode to a separation of boom cap 315 and boom 214 from the remainder of spar-boom joiner 300 and wing spar 203.

Spar-boom joiner 300 includes a number of "frangible" design features that allow wing spar 203 (and thus fuselage 104) to separate from booms 214 in the event of a collision impacting the end of one or both booms 214. The first feature includes isolating the pin structure (i.e., anti-rotation pin 325) that prevents rotation of boom 214 within boom cradle 345 from the pin structure (i.e., spar fastener 320) that prevents rotation of wing spar 203 within spar cradle 340. This enables lesser/different strength material to be used with anti-rotation pin 325 than spar fastener 320. In the event of collision, anti-rotation pin 325 shears off well before failure of spar fastener 320.

The second feature includes the use of lesser shear strength mechanical fasteners for implementing boom fasteners 330 compared to spar-cap fasteners 335 and/or spar fastener 320. For example, each of the four boom fasteners 330 are fabricated of a material having a lesser shear strength than spar fastener 320, which secures wing spar 203 into spar cradle 340. As a result, boom fasteners 330 are selected to fail (e.g., shear or tensile failure) in a boom collision, which releases the grip boom cap 315 has on boom 214. This release prevents the inertia associated with wing spar 203 and fuselage 104 from being carried through to the tips of booms 214. In one embodiment, boom fasteners 330 are plastic screws. One type of suitable plastic for boom fasteners 330 is polyetheretherketone (PEEK). Other types of plastics or materials (e.g., aluminum) may be implemented as well.

Additional frangible features may be integrated into spar-boom joiner 300. For example, joiner core 305 may be designed as the frangible link itself with integrated failure points to allow joiner core 305 to break apart upon impact as opposite to a separation of boom cap 315.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A mechanical joiner for an airframe, comprising:
a joiner core having a first side with a first cradle shaped to hold a first structural member and a second side with a second cradle shaped to hold a second structural member;
a first cap shaped to mate to the first side of the joiner core and clamp the first structural member into the first cradle, wherein the joiner core includes a first hole for a first mechanical fastener to extend through and across the first cradle to secure the first cap to the joiner core; and
a second cap shaped to mate to the second side of the joiner core and clamp the second structural member into the second cradle, wherein the second cap includes second holes for second mechanical fasteners, distinct from the first mechanical fastener, to secure the second cap to the joiner core.

2. The mechanical joiner of claim 1, wherein the first mechanical fastener does not extend through the second cap.

3. The mechanical joiner of claim 2, wherein a head of the first mechanical fastener is recessed into the second cradle of the joiner core so as not to physically interfere with seating the second structural member into the second cradle.

4. The mechanical joiner of claim 1, wherein the second mechanical fasteners that secure the second cap each have less shear or tensile strength than the first mechanical fastener that passes through and across the first cradle.

5. The mechanical joiner of claim 4, wherein the second mechanical fasteners comprise four plastic screws that thread into the second side of the joiner core.

6. The mechanical joiner of claim 4, wherein the first mechanical fastener comprises a metal mechanical fastener and the metal mechanical fastener comprises a nut and a bolt.

7. The mechanical joiner of claim 1, further comprising:
an anti-rotation pin that extends through the second cap into the second structural member to prevent rotation of the second structural member within the second cradle.

8. The mechanical joiner of claim 7, wherein the anti-rotation pin comprises a nylon screw.

9. The mechanical joiner of claim 7, further comprising:
a layer of adhesive applied to an inside surface of the second cap that conforms with and mates to the second structural member to adhere the second structural member to the second cap.

10. The mechanical joiner of claim 1, wherein the joiner core, the first cap, and the second cap are fabricated of glass filled nylon and the first structural member and the second structural member each comprise a hollow tubular rod.

11. An unmanned aerial vehicle (UAV), comprising:
a wing assembly including a wing spar;
a boom assembly including a boom and a plurality of motor mounts secured to the boom; and
a spar-boom joiner for mechanically securing the wing spar to the boom, the spar-boom joiner including:
a joiner core having a first side with a spar cradle shaped to hold the wing spar and a second side with a boom cradle shaped to hold the boom;
a spar cap shaped to mate to the first side of the joiner core and clamp the wing spar into the spar cradle, wherein a spar fastener extends through the wing spar and secures the spar cap to the joiner core; and
a boom cap shaped to mate to the second side of the joiner core and clamp the boom into the boom cradle, wherein second mechanical fasteners, distinct from the spar fastener, secure the boom cap to the joiner core.

12. The UAV of claim 11, wherein the spar fastener is a mechanical fastener that does not extend through the boom cap.

13. The UAV of claim 12, wherein a head of the spar fastener is recessed into the boom cradle of the joiner core so as not to physically interfere with seating the boom into the boom cradle.

14. The UAV of claim 11, wherein the second mechanical fasteners each have less shear or tensile strength than the spar fastener.

15. The UAV of claim 14, wherein the second mechanical fasteners comprise four plastic screws that thread into the second side of the joiner core.

16. The UAV of claim 14, wherein the spar fastener comprises a metal mechanical fastener and the metal mechanical fastener comprises a nut and a bolt.

17. The UAV of claim 11, further comprising:
an anti-rotation pin extending through the boom cap into the boom to prevent rotation of the boom within the boom cradle.

18. The UAV of claim 17, wherein the anti-rotation pin comprises a nylon screw.

19. The UAV of claim 17, further comprising:
a layer of adhesive applied to an inside surface of the boom cap that conforms with and mates to the boom to adhere the boom to the boom cap.

20. The UAV of claim 11, wherein the joiner core, the spar cap, and the boom cap are fabricated of glass filled nylon and the wing spar and the boom each comprise a hollow tubular rod.

21. The UAV of claim 11, further comprising a modular fuselage secured to the wing spar, the modular fuselage including:
a first section secured to the wing spar with a second joiner that clamps onto the wing spar, wherein the second joiner is clamped with first plastic screws selected to fail upon a collision impact of the modular fuselage; and
one or more other sections connected to the first section, wherein the one or more other sections are secured to the first section at connection points secured together with second plastic screws selected to fail upon the collision impact of the modular fuselage.

* * * * *